(12) United States Patent
Mody et al.

(10) Patent No.: US 6,684,464 B1
(45) Date of Patent: Feb. 3, 2004

(54) BUNDLING STRAP

(75) Inventors: Kirit C. Mody, Shoreview, MN (US); Michael W. G. Mills, Cottage Grove, MN (US); Ronald W. Ausen, St. Paul, MN (US); Shou-Lu Grace Wang, Woodbury, MN (US); Alan J. Sipinen, North Oaks, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/214,050

(22) Filed: Aug. 7, 2002

(51) Int. Cl.[7] ............................................. A44B 18/00
(52) U.S. Cl. ...................... 24/306; 24/30.5 R; 24/442
(58) Field of Search .......................... 24/306, 442, 452, 24/30.5 R; 428/99, 100; 40/665, 668, 633

(56) References Cited

U.S. PATENT DOCUMENTS

| | | | |
|---|---|---|---|
| 4,091,766 A | * | 5/1978 | Colliard ...................... 428/100 |
| 5,005,264 A | | 4/1991 | Breen |
| 5,572,775 A | * | 11/1996 | Mailloux et al. ............. 24/339 |
| 5,732,495 A | | 3/1998 | Lowe et al. |
| 5,733,652 A | | 3/1998 | Stowman et al. |
| 5,878,520 A | | 3/1999 | Milbrandt et al. |
| 5,913,619 A | | 6/1999 | Lowe |
| 6,058,639 A | | 5/2000 | Tinklenberg et al. |
| 6,106,922 A | | 8/2000 | Cejka et al. |
| 6,174,476 B1 | | 1/2001 | Kennedy et al. |
| 6,279,255 B1 | | 8/2001 | Larsen |
| 6,349,493 B1 | * | 2/2002 | Newman et al. .............. 40/665 |
| 6,367,128 B1 | | 4/2002 | Galkiewicz et al. |
| 6,562,455 B2 | * | 5/2003 | Tozuka et al. ................. 156/70 |
| 2002/0160143 A1 | * | 10/2002 | Shepard et al. ............... 428/99 |

\* cited by examiner

*Primary Examiner*—Robert J. Sandy
(74) *Attorney, Agent, or Firm*—Gary L. Griswold; Robert W. Sprague; William J. Bond

(57) ABSTRACT

There is provided a mechanical fastener bundling strap comprising a bundling strap having a first face and a second face with a bar code readable through hook elements on a first face. The first face is formed by a thermoplastic hook strip material having a first face and a second face. The hook strip first face has an array of upstanding hook projections which form at least in part the first face of the bundling strap, the second face of the hook strip comprises a film which film is provided with a printed UPC code readable through the hook strip first face.

17 Claims, 4 Drawing Sheets

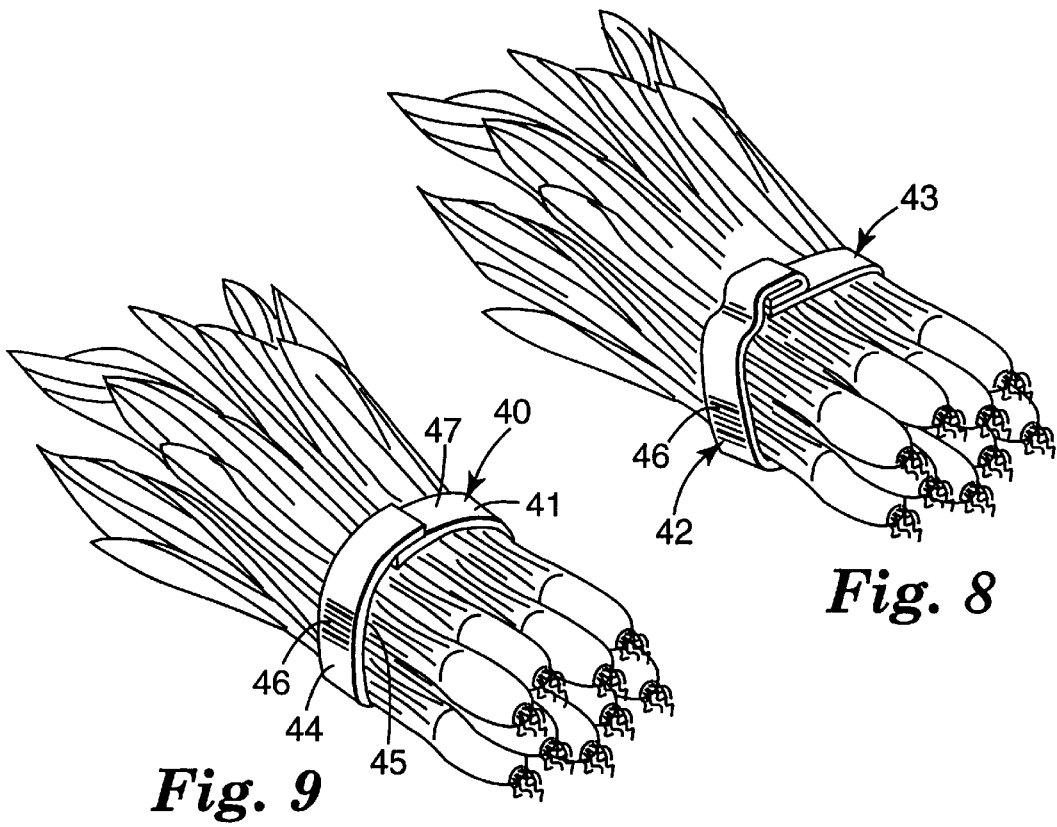
Fig. 8
Fig. 9
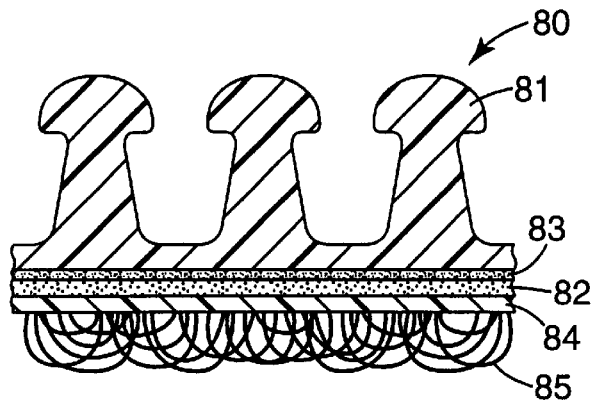
Fig. 10
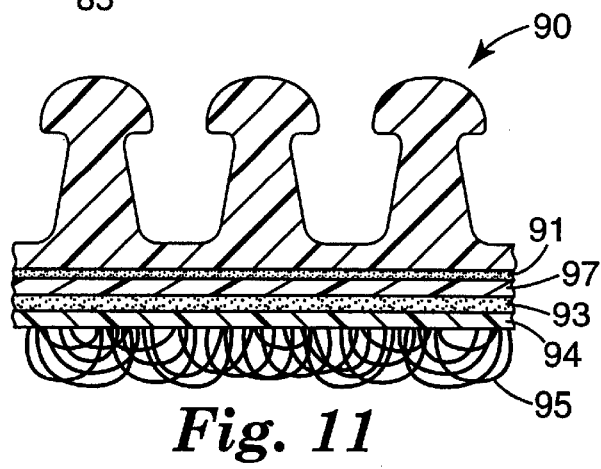
Fig. 11

BUNDLING STRAP

BACKGROUND AND FIELD OF THE INVENTION

The present invention relates to a mechanical bundling strap which is provided with a Universal Product Code (UPC), which is self-mating and is easy to manufacture.

In the retail industries, particularly the grocery and food industries, it is common to provide most products with either UPC or PLU codes to allow the price to be entered at the point of sale. UPC codes are generally preferred in that they can be more rapidly entered using bar code readers without manual entry, as with a PLU code. However, UPC codes are limited in that they must be presented on a substrate which is substantially undeformed so as not to distort the code and also present the bar code in a readable format. With grocery items, such as fruits and vegetables, generally the product has a variable width. The most common material used to hold these products together are elastic containing, which have a variable circumference and can provide some restraining force to keep the product packaged or together. Generally, the most common material is an elastic or rubber band, which is wrapped around the product. These rubber bands are not susceptible to printing of UPC codes in that if they are extended and distorted the UPC code is made unreadable. However, PLU codes can be printed on the surface of a rubber band. U.S. Pat. Nos. 5,943,804; 5,913,619; 6,279,255 and 6,058,639 all propose various alternatives of providing tags which are attached or attachable to a standard rubber band used with produce, which tags can be printed with a UPC code. The tags are dimensionally stable and water resistant as well as tear resistant. Generally, the tags are described as being printable plastic sheets and it is emphasized that these tags must be nonelastomeric so as not to disrupt or distort the bar codes.

Although these tags can be employed with standard rubber bands, they require generally, a complicated manufacturing or manual assembly process when attached to the rubber bands. Also the tags when attached to the rubber bands are not easily dispensable or provided in a convenient form for the end user (e.g., in a roll form).

U.S. Pat. No. 5,733,652 describes elastic bands which can be joined together to form a wrapping strap or bundling system useable with a variety of products. The elastics pieces are generally joined together by a non-tacky pressure-sensitive adhesive and it is indicated that the elastic bands can be printed with various information including PLU and UPC codes. In order to be functional, when the strip is printed with a UPC code the strip would need to be non-distorted during use to enable scannability. It is indicated that scannability can only be obtained if the strips are uniformly elongated along its entire length so as not to distort the UPC code. However, uniform controlled elongation is not likely to happen in ordinary use.

U.S. Pat. No. 5,878,520 describes an interlocking male/female strap formed generally of plastic which can be printed with a UPC or PLU code. The problem with this device is that it engages and is adjustable when it is engaged however is difficult to disengage by the end user in that the locking male section engages with a hole and requires a complex twisting action in order to be removed which would not be readily apparent to a casual end user.

U.S. Pat. No. 5,005,264 discloses a twist-tie type fastener for use with bags, food or the like. The metal wire is sandwiched between two strips of deformable material. One of the strips of deformable material is made larger and coated with a pressure-sensitive adhesive to allow the twist-tie to be engaged without a twisting action, which is described as useful for people having limited manual dexterity. It is also indicated that instead of adhesive that the surface can be provided with a "hook and loop cloth", however, there is no indication of how this would function so that the hook and loop cloth could be self-mating. It is also indicated that UPC codes could be provided on a flat back surface of the tape backing.

U.S. Pat. No. 5,732,495 describes a standard twist-tie however the UPC code is provided in this case by the use of a tag which is attached to the twist-tie at one end. The tag is a discrete element which is heat fused or adhesion bonded to itself at one end and provided with a suitable UPC marking in the body portion. This is similar to the tags used with the elastic bands discussed above and has similar problems.

SUMMARY OF THE INVENTION

The invention relates to a mechanical fastener bundling strap comprising a bundling strap having a first face and a second face with the first face formed by a thermoplastic hook strip material having an array of upstanding hook projections and film backing provided with a printed UPC code readable through the hook projection. The strap is engagable with itself (self-mating) by use of a loop fabric or a self-mating hook mechanical fastener at another location on the bundling strap. The hook strip film backing is characterized preferably by a band that runs at an angle to the bar code that has a continuous zone of transparency. This zone of transparency can be linear or nonlinear and has a transparency gap of at least 250 µm and a transparency gap percentage of at least 20 percent.

BRIEF DESCRIPTION OF THE DRAWINGS

The present invention is further described in reference to the accompanying drawings where like reference numerals refer to like parts in some of the several view.

FIG. 8 is a perspective view of a bundling strap as employed in the present invention;

FIG. 9 is an alternative method of employing a bundling strap in accordance with the present invention;

FIG. 10 is a side view of an embodiment of a bundling strap of the present invention;

FIG. 11 is a side view of another embodiment of a bundling strap in accordance with the present invention.

DETAILED DESCRIPTION OF THE INVENTION

Figure 1:
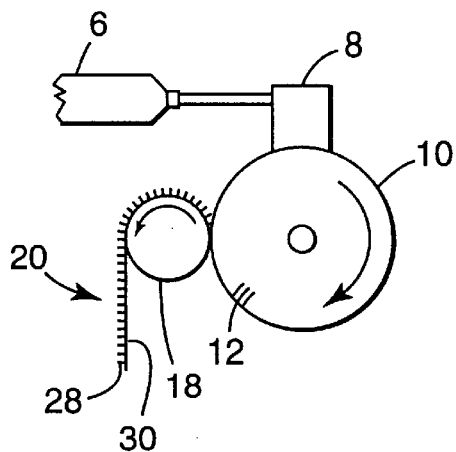
FIG. 1 is a schematic view of a first method for forming an extruded hook strip used to form a bundling strap in accordance with the invention.

Difficulty with providing readable bar codes is encountered in the process of printing bar codes, packaging goods with the bar code readable thereon and accurately reading the bar code on the packaged goods at the point of sale. Many variables are involved in the process of providing acceptably readable bar codes. First of all, the readability of the bar code at the point of sale depends upon the quality control of the printing process. Secondly, the bar code must be readable at each potential point of sale. Because the scanning laser device at each point of sale may "see" the bar code in its own unique way which may be different from what will be "seen" at any other similar device at any other point of sale, a tremendous difficulty is encountered because of this factor alone.

The invention is related to a novel bundling strap which is mechanically self-mating having at least a hook strip on one face and a surface engagable with the hook strip on the same or opposite face of the bundling strap wherein a UPC code is printed or provided on the backside of the hook strip so as to be readable through the hooks.

The hooks are extruded hook materials having a substantially continuous film backing. The hook elements project outwardly from the film backing in a regular array. The film between adjacent hooks is smooth or substantially continuously transparent at least along bands of adjacent hooks running the length of the bar code at an angle to the UPC code bars, preferably an angle of from 0 to 45 degrees. Generally, the film between adjacent hooks is smooth or substantially transparent along the at least one band that runs at least the length of the printed bar code, in either a linear or nonlinear manner. This band along its length has a transparency gap or gaps, having a width of at least 250 $\mu$m and preferably at least 300 $\mu$m, most preferably at least 400 $\mu$m and preferably a transparency gap percentage of at least 20 percent, preferably at least 30 percent. The film backing of the hooks, and preferably the hooks as well, are formed from a substantially transparent film resin such that the hook strip has an overall opacity of less than 50 percent, preferably less than 30 percent. The hook strip when provided with a printed bar code on the film side has a bar code scannability (as defined herein) on the hook side of greater than 10, preferably greater than 50.

The bar code can be printed directly onto the back face or film surface of the hook strip or printed onto another substrate or film which is then laminated to the back face of the hook strip preferably by standard adhesive lamination. Other bonding techniques could also be used with joining of a printed substrate to the hook strip provided that the technique does not substantially effect the performance of the hook elements or the readability of the bar code. Printing could be enhanced by coextruding a more printable layer onto the back face of the hook strip as disclosed in U.S. Pat. No. 6,106,922 or by treating the back face of the hook strip by corona or other standard techniques.

The opposite face of the bundling strap can be provided over all, or a portion, of its surface with a web that is engagable with the UPC code printed or provided book strip. This could be another hook strip that self-mates, for example, as disclosed in U.S. Pat. No. 6,367,128 or a standard fibrous loop type material such as a nonwoven, woven or knitted loop, which may or may not be provided with a continuous backing. If the fibrous loop or self mating hook strip is provided with a continuous backing the backing could be printed with the UPC code and laminated to the hook strip. The loop material or mating hook strip could be laminated by standard adhesive, heat or mechanical methods (sewing or needling) to the hook strip or an intermediate printed substrate before or after it is joined to the hook strip. However, the lamination method cannot destroy the functionality of the hook strip or destroy the readability of the UPC code, however the UPC code is provided. A web engagable with the hook strip can also be provided on the same face of the bundling strap as the hook strip but in a spaced apart location. In this case, the hook strip needs to be large enough to engage with the mating web and still be provided with a UPC code.

A first method of forming hook strips with a continuous film backing is by extruding a thermoplastic resin through a die onto a continuously moving mold surface with cavities. This is generally a roll surface 10 as shown in FIG. 1. The molten resin is extruded or forced into the cavities 12 by pressure generally by use of a nip. In the case of FIG. 1, the nip is formed by the extruder die 8 and the roll 10 but alternatively the polymer could be extruded between two roll surfaces or the like. The nip or gap is sufficient that a film backing 30 is also formed over the cavities. The film backing preferably has a smooth surface along the back but could have a textured or rough surface. The formed material 20 has projection or hook elements 28 projecting from a film backing 30 which material is removed from the mold surface by a take-up device 18. A vacuum can be used to evacuate the cavities for easier extrusion into the cavities.

Figure 2:
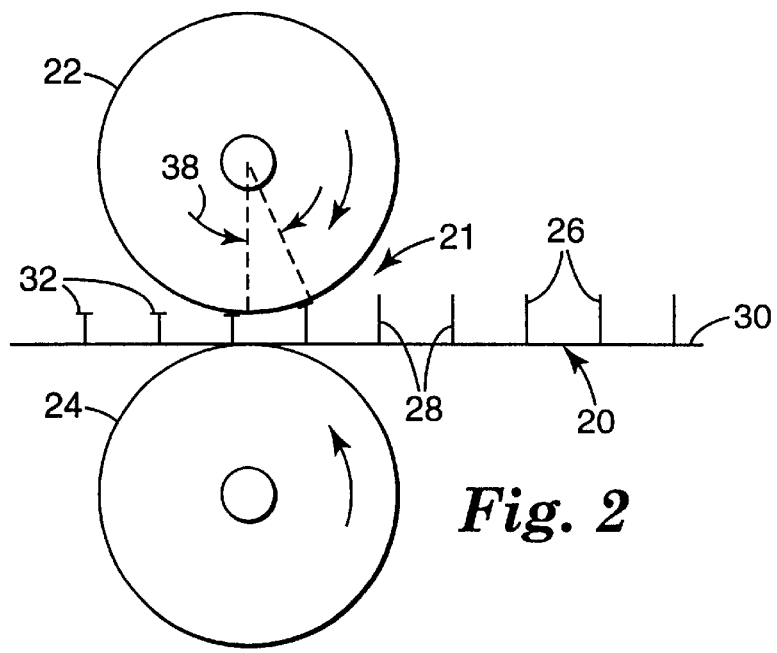
FIG. 2 is a schematic view of a further method used in forming a bundling strap hook strip in accordance with the present invention.

The cavities 12 could be in the shape of the final hook elements as disclosed, for example, in U.S. Pat. No. 6,174,476. In this case, a generally continuously tapered hook is pulled from continuously tapered hook cavities in its final hook form. Also, the extruded strip 20 could also be a web provided with only partially formed hook elements or, as shown in FIG. 2, unformed hook elements forming projections. The tip portion 26 of these projections (or the tips of partially formed hook elements) then need to be subsequently formed into the finished hook elements 32. This would, in a preferred method, be done by deforming the tip portions under heat and pressure. The heat and pressure could be applied sequentially or simultaneously. In a preferred method, heat and pressure is selectively applied to the tip portion 26 in a nip 21. In this case, there is provided a nip 21 having at least one first heated surface member 22 and at least one second opposing surface member 24. The nip has a gap which gap has a compression zone defined by a first entry gap width and a second end gap width. The first gap width is substantially equal to or less than the web first average thickness. The second end gap width is less than the first web thickness and is the smallest gap width of the nip 21. The final hook strip has formed hook heads 32 on the projection 28.

A specific suitable method for forming a film having an array of upstanding projections for use in the FIG. 2 process is shown in FIG. 1. A feed stream of preselected thermoplastic resin is fed by conventional means into an extruder 6 which melts the resin and moves the heated resin to a die 8. The die 8 extrudes the resin as a wide ribbon of material onto a mold surface 10, e.g., a cylinder, having an array of mold cavities 12 in the form of elongated holes, which preferably taper to facilitate removal of the solidified resin from the mold cavities. These holes or mold cavities are preferably in the form of straight (i.e., only one axis in the length direction) cavities. The mold cavities can be connected to a vacuum system (not shown) to facilitate resin flow into the mold cavities. This could require a doctor blade or knife to remove excess material extruded into the interior face of the mold cylinder. The mold cavities 12 preferably terminate in the mold surface having an open end for entry of the liquid resin and a closed end. In this case, a vacuum could be used to at least partially evacuate the mold cavities 12 prior to entering the die 8. The mold surface 10 preferably matches that of the die 8 where they are in contact to prevent excess resin being extruded out, e.g., the die side edges. The mold surface and cavities can be air or water cooled, or the like, prior to stripping the integrally formed backing and upstanding formed stems from the mold surface such as by a stripper roll 18. This provides a web 20 of a backing 30 having integrally formed upstanding stems or hooks 28 of thermoplastic material. Alternatively, upstanding stems could be formed on a preformed backing or the like by extrusion molding or other known techniques.

More specifically describing the FIG. 2 process, the heated calender roll 22 contacts a predetermined portion of a distal end 26 of the stems 28 projecting upward from the backing 30. The roll temperature will be that which will readily deform the distal ends 26 under pressure created by the nips in the compression zone 38 without causing resin to stick to the roll 22 surface. The roll 22 surface can be treated with release coatings resistant to high temperature to allow for higher temperatures and/or longer contact times between the stem tips or distal ends 26 and the heated roll 22.

The hooks are generally of uniform height, preferably from about 0.10 to 1.3 mm in height, and more preferably from about 0.2 to 0.5 mm in height. The capped stem hooks have a density on the backing preferably of from 60 to 1,600 hooks per square centimeter, and more preferably from about 100 to 700 hooks per square centimeter. With capped hooks, the stem base portions have a diameter adjacent the heads of the capped stem hooks, preferably from 0.07 to 0.7 mm, and more preferably from about 0.1 to 0.3 mm. The capped heads project radially past the stem base portions on at least one side preferably by, on average, about 0.01 to 0.3 mm, and more preferably by, on average, about 0.02 to 0.25 mm and have average thicknesses between their outer and inner surfaces (i.e., measured in a direction parallel to the axis of the stems) preferably from about 0.01 to 0.3 mm and more preferably from about 0.02 to 0.1 mm. The capped heads have an average diameter (i.e., measured radially of the axis of the capped heads and the stems) to average capped head thickness ratio preferably from 1.5:1 to 12:1, and more preferably from 2.5:1 to 6:1.

For most hook-and-loop uses, the hooks should be distributed substantially uniformly over the entire surface area of the hook strip, usually in a square, staggered or hexagonal array. For hermaphroditic uses, the hooks preferably are distributed to prevent lateral slippage when engaged.

Figure 3:
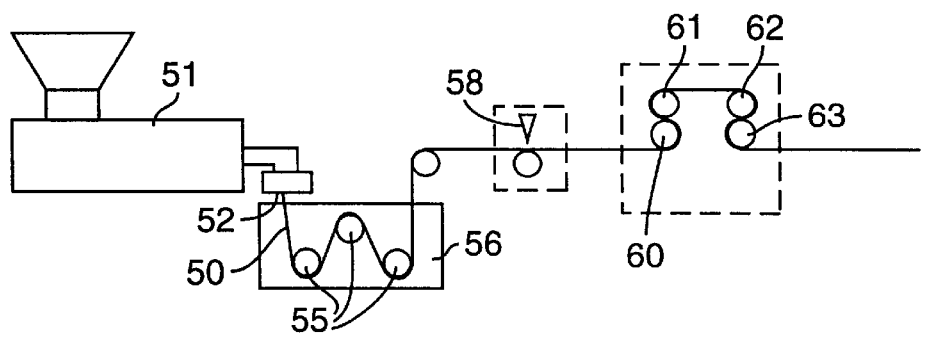
FIG. 3 is a schematic view of a second method for forming an extruded hook strip used to form a bundling strap in accordance with the invention.
Figure 4:
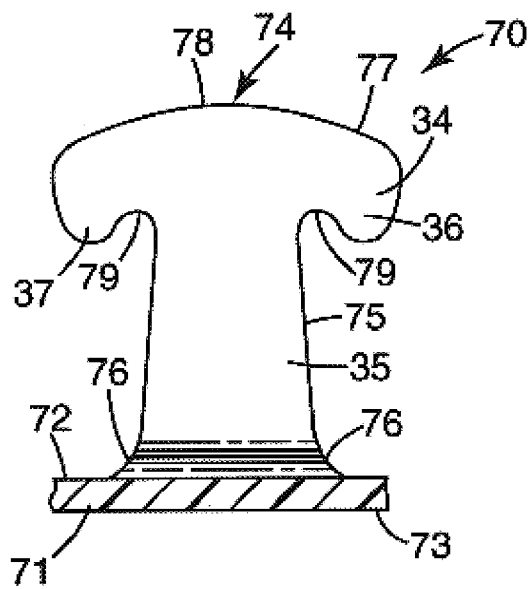
FIG. 4 is a side view of a hook formed by the method of FIG. 3.

A second method for forming a hook strip having hooks, such as that of FIG. 4, is schematically illustrated in FIG. 3. Generally, the method includes first extruding a strip 50 of thermoplastic resin from an extruder 51 through a die 52 having an opening cut, for example, by electron discharge machining, shaped to form the strip 50 with a base and elongate spaced ribs projecting above an upper surface of the base layer that have the cross sectional shape of the hook portions or members to be formed. The strip 50 is pulled around rollers 55 through a quench tank 56 filled with a cooling liquid (e.g., water), after which the ribs (but not the base layer) are transversely slit or cut at spaced locations along their lengths by a cutter 58 to form discrete portions of the ribs having lengths corresponding to about the desired thicknesses of the hook portions to be formed. Optionally, the strip can be stretched prior to cutting to provide further molecular orientation to the polymers forming the ribs and/or reduce the size of the ribs and the resulting hook members formed by slitting of the ribs. The cutter 58 can cut using any conventional means such as reciprocating or rotating blades, lasers, or water jets, however preferably it cuts using blades oriented at an angle of about 60 to 80 degrees with respect to length of the ribs.

After cutting of the ribs, the base of the strip 50 is longitudinally stretched at a stretch ratio of at least 2 to 1, and preferably at a stretch ratio of about 4 to 1, preferably between a first pair of nip rollers 60 and 61 and a second pair of nip rollers 62 and 63 driven at different surface speeds. Optionally, the strip 50 can also be transversely stretched to provide biaxial orientation to the base. Roller 61 is preferably heated to heat the base prior to stretching, and the roller 62 is preferably chilled to stabilize the stretched base. Stretching causes spaces between the cut portions of the ribs, which then become the hook portions or members 74 for the completed hook fastener portion 70.

Referring now to FIG. 4, a hook fastener portion 70 comprises a thin strong flexible film-like backing 71 having generally parallel upper and lower major surfaces 72 and 73, and a multiplicity of spaced hook members 74 projecting from at least the upper surface 72 of the backing 71. The backing can have planar surfaces or surface features as could be desired for tear resistance or reinforcement. The hook members 74 each comprise a stem portion 75 attached at one end to the backing 71 and preferably having tapered sections 76 that widen toward the backing 71 to increase the hook anchorage and breaking strengths at their junctures with the backing 71, and a head portion 77 at the end of the stem portion 75 opposite the backing 71. The sides 34 of the head portion 77 can be flush with the sides 35 of the stem portion 75 on two opposite sides. The head portion 77 has hook engaging parts or arms 36, 37 projecting past the stem portion 75 on one or both sides. The hook member has a rounded surface 78 opposite the stem portion 75 to help the head portion 77 enter between loops in a loop fastener portion. The head portion 77 also has transverse cylindrically concave surface portions 79 at the junctures between the stem portion 75 and the surfaces of the head portion 77 projecting over the backing 71.

The backing of the hook strip should be thick enough to allow it to be attached to a substrate by a desired means such as sonic welding, heat bonding, sewing or adhesives, including pressure sensitive or hot melt adhesives, and to firmly anchor the stems. Generally, the hook strip backing and/or the bundling strap has a Gurley stiffness of 10 to 2000, preferably 10 to 200 so as to allow it to be rigid enough to allow the UPC code to be read without substantial deformation of the code when used either by itself or laminated to a further carrier backing structure such as a nonwoven, woven, knitted or film-type backing. The optimum backing thickness will vary depending upon the resin from which the hook fastener portion is made, but will generally be between 20 $\mu$m and 1000 $\mu$m, and is preferably 20 to 200 $\mu$m. The backing should generally be substantially nondeformable when used alone or laminated to a further substrate.

Suitable thermoplastic materials for forming the hook strip, however formed, include generally transparent polyolefins such as polypropylenes or polyethylenes, polyamides such as nylon, polyesters such as poly(ethylene terephthalate), plasticized polyvinyl chloride, copolymers and blends thereof, optionally, with other polymers or plasticizers, or the like or coextruded versions.

FIG. 8 is a perspective view of a bundling strap 43 of the present invention where the hook strip is engagable with itself or a mating element provided on the same face of the bundling strap. A hook strip 47 is a self mating material if it engages with itself. If a mating mechanical fastener is provided on the same face of the bundling strap as the UPC code 46 provided hook strip these separate elements would typically be laminated to a common backing or carrier substrate. In FIG. 9 is shown a more typical embodiment where the bundling strap 41 has a hook strip 47 which is engagable with a mating web 45 on the back side of the bundling strap 40.

FIG. 10 is a depiction of a representative embodiment of a bundling strap in accordance with the present invention where a hook strip 80 having hook elements 81 is provided with a bar code printing 83 on the back side of the hook strip. This printed hook strip is then laminated by a pressure-sensitive or hot melt adhesive 82 to a loop material 85 which preferably is provided with a backing 84. FIG. 11 is an alternative hook strip where the hook strip 90 is laminated by an adhesive layer 91 to a substrate 97 provided with a printed bar code. This layer is then further laminated by a pressure-sensitive adhesive 93 or the like to a loop material 95 having a backing 94.

TEST METHODS

Opacity

The Opacity of the hook material webs was measured using a HunterLAB Color Quest 45/0 colorimeter (Reston, Va.) using a ½" diameter opening, configured with the following settings; Scale—Hunter LAB, Procedure—Opacity (Y), Differences—DE*, Indices—ALPHA 20 mm, Display mode—Absolute, Delta E Illuminate—D65, and Delta E Observer 10°. The hook material web was placed against the opening with the hook side toward light source. The opacity was calculated from the following equation: Opacity $(Y)=(Y_{light\ trap}/Y_{white\ backing})\times 100$. An average of two readings was used for each measurement. A value of 100 indicates that the material is completely opaque with no light able to go through. A value of zero indicates that the material is completely transparent to visible light.

Scannability

The ability to read a UPC (Universal Product Code) bar code through the hook material was determined using a RJS D4000 laser verification scanner (Printronix Inc. 14600 Myford Rd., Irvine, Calif. 92623) and the following procedure. The scanner "gun" was rigidly mounted 6.4 cm above a bench top. The hook material webs were placed on the bench top, hook side up, on top of a standard reference bar code (RJS reference sheet, part number 002-1958 Rev. B, bar code I-20F5). The webs were positioned such that the angle of the scanner with respect to the bench top was 80 degrees. The scanner "trigger" was held continuously for 5 seconds. The scanner output device recorded the number of correct reads per number of tries (i.e., 73/110=66%). The five second scans were repeated 5 times and averaged. In simplistic terms, the bar code is read by sweeping a small spot of light back and forth in a straight scan line, across the hook material above the bar code. A successful scan requires that the spot of light sweep across all black and white lines, thus the scan line must be near perpendicular to the bars of the bar code. The direction of the scan line was either in a y-direction (generally parallel to the machine direction of the hook material web), or an x-direction, orthogonal to the y-direction (generally parallel to the cross direction of the hook material web) as noted in Table 2 below.

Transparency Gap

Figure 6:
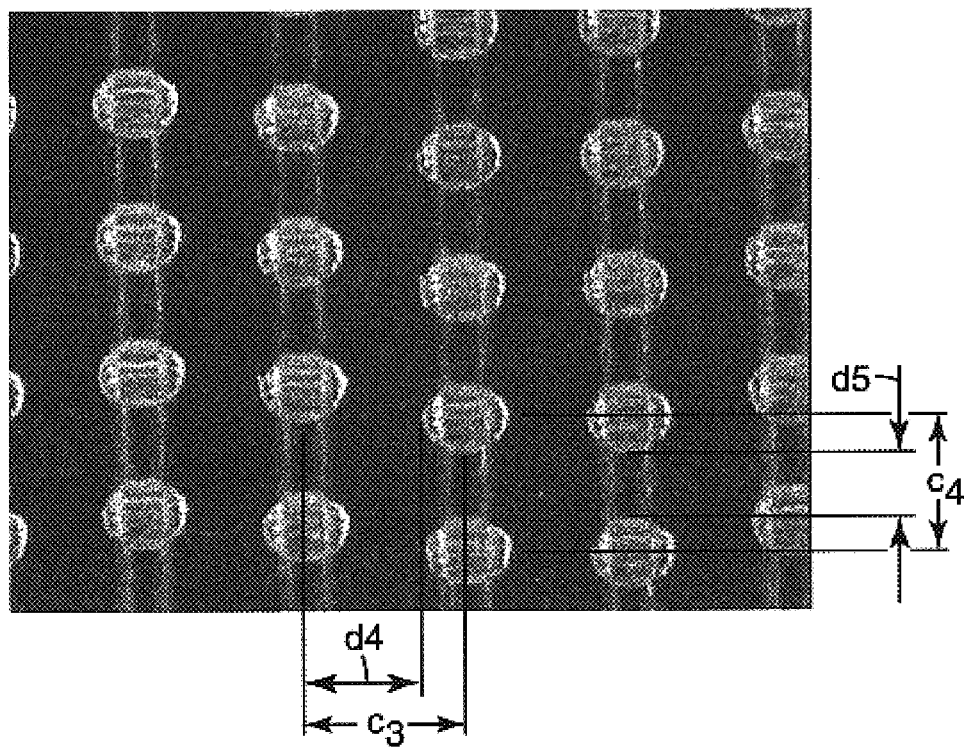
FIG. 6 is a top view of a hook strip useful in the present invention bundling strap.

The ability to successfully scan a bar code through a hook material web depends not only upon the overall Opacity of the web, but also upon the ability of the scanner to successfully interpret the width of any individual bar in the printed bar code. Webs such as hook material webs, having three dimensional structures or features above a flat base, can be difficult to scan because the structures can appear opaque to the scanner, especially if the dimensions of the structures approach the width of the bars of the printed bar code. It has been found that the distance between two adjacent hook structures (the gap) affects the scannability of the printed bar code beneath. The gap appears transparent to the scanner (provided the overall Opacity is not too high), while the hook structures appear opaque to the scanner. Not all structures or topographical features will appear opaque to the scanner. Depending upon several factors such as resin, thickness, processing conditions, etc., the structures or portions of the structures may appear transparent to the scanner. Transparency gap is that portion of the gap which appears transparent to the scanner and is obtained in the following manner. A 7.6 cm by 7.6 cm hook sample was placed hook side up on a microscope stage mount equipped with a micrometer adjustment. A magnification of approximately 15× was used with the sample being lit from above. A piece of black paper was placed beneath the hook sample. A crosshair generator was used to align the hook perpendicular to the bar code scan direction. The microscope stage was moved to align an individual hook center with the center of the crosshair. The stage was moved perpendicular to the scan direction to the center of the next nearest hook in a 60 degree range. The micrometer reading was recorded and labeled as hook spacing ($C_n$). The measurement procedure was repeated except only the distance ($d_n$) corresponding to transparent material was measured and recorded as the transparency gap (sum of $d_n$ between a given hook spacing $C_n$). The distance d selected ignored opaque lines less than the width of standard bar codes, such as the narrow opaque lines shown in FIG. 6. The distance d otherwise was selected at right angles to the hook rows. The transparency gap was divided by the hook spacing, multiplied by 100, and recorded as percent (%) transparency gap.

$$\frac{d_1 + d_2 + \ldots \cdot 100}{C_n} = \%\ \text{Transparency Gap}$$

The transparency gap and percent transparency gap was measured in the y-direction and x-direction of the web as indicated in Table 2.

Hook Material 1

Figure 5:
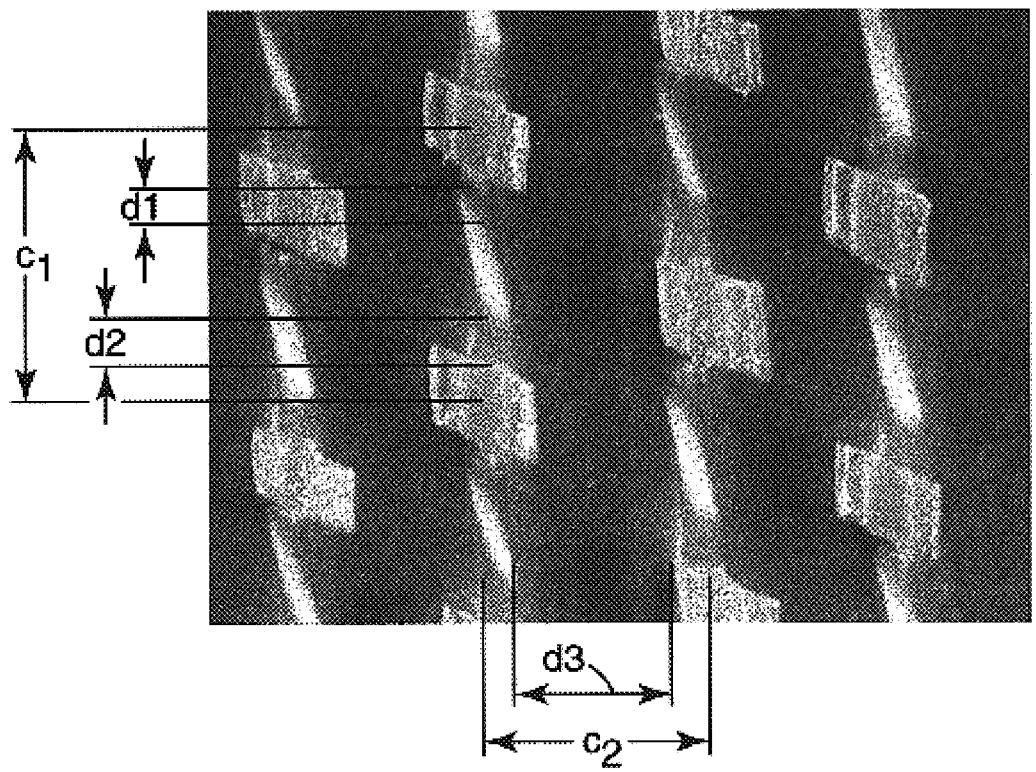
FIG. 5 is a top view of a hook strip useful in the present invention bundling strap.

A mechanical fastener hook material web was made using the apparatus shown in FIG. 3. A polypropylene/polyethylene copolymer (Accpro 9117, 2.0 MFI, BP Amoco Polymers, Inc.) was extruded with a 6.35 cm single screw extruder (24:1 L/D) using a barrel temperature profile of 177° C.–232° C.–246° C. and a die temperature of approximately 235° C. A white color concentrate consisting of 50% TiO2 and 50% PP/PE copolymer was added to the extruder at 0.5% by weight of the total extrudate. The extrudate was extruded vertically downward through a die having an opening cut by electron discharge machining. After being shaped by the die, the extrudate is quenched in a water tank at a speed of 6.1 meter/min with the water being maintained at approximately 10° C. The web was then advanced through a cutting station where the ribs (but not the base layer) were transversely cut at an angle of 23 degrees measured from the transverse direction of the web. The spacing of the cuts was 305 microns. After cutting the ribs, the base of the web was longitudinally stretched at a stretch ratio of approximately 4.1 to 1 between a first pair of nip rolls and a second pair of nip rolls to further separate the individual hook elements to approximately 8 hooks/cm. There were approximately 10 rows of ribs or cut hooks per centimeter. The upper roll of the first pair of nip rolls was heated to 143° C. to soften the web prior to stretching. The general profile of this hook is depicted in FIG. 4. A top view of the hook material web is shown as a photomicrograph in FIG. 5. The transparency gap was d3 in the x-direction and the hook spacing between adjacent hooks was $C_2$. The transparency gap was the sum of d1 and d2 in the y-direction and the hook spacing was $c_1$.

Hook Material 2

A web was prepared similar to the Hook Material web 1 except the width of the hook cap was changed by adjusting the die lip gap to adjust die pressure which affects die swell and thus affects the hook dimensions. White color concentrate was added at 0.25%.

Hook Material 3

A web was prepared similar to the Hook Material web 1 except the width of the hook cap was changed by adjusting the die lip gap to adjust die pressure. White color concentrate was added at 0.5%.

Hook Material 4

A web was prepared similar to the Hook Material web 1 except the width of the hook cap was changed by adjusting the die lip gap to adjust die pressure. White color concentrate was added at 1.0%.

Hook Material 5

A web was prepared similar to the Hook Material web 1 except the width of the hook cap was changed by adjusting the die lip gap to adjust die pressure. White color concentrate was added at 0.5%.

Hook Material 6

A web was prepared similar to the Hook Material web 1 except the width of the hook cap was changed by adjusting the die lip gap to adjust die pressure. No white color concentrate was added.

Hook Material 7

A web was prepared similar to the Hook Material web 1 except the width of the hook cap was changed by adjusting the die lip gap to adjust die pressure. White color concentrate was added at 0.75%.

Hook Material 8

A web was prepared similar to the Hook Material web 1 except the width of the hook cap was changed by adjusting the die lip gap to adjust die pressure. White color concentrate was added at 0.25%.

Hook Material 9

A web was prepared similar to the Hook Material web 1 except the width of the hook cap was changed by adjusting the die lip gap to adjust die pressure. White color concentrate was added at 0.5%.

Hook Material 10

A web was prepared similar to the Hook Material web 1 except the width of the hook cap was changed by adjusting the die lip gap to adjust die pressure. White color concentrate was added at 0.75%.

Hook Material 11

A web was prepared similar to the Hook Material web 1 except the width of the hook cap was changed by adjusting the die lip gap to adjust die pressure. White color concentrate was added at 0.5%.

Hook Material 12

A web was prepared similar to the Hook Material web 1 except the width of the hook cap was changed by adjusting the die lip gap to adjust die pressure. White color concentrate was added at 1.5%.

Hook Material 13

Commercially available hook material XMH-01-062 from 3M Corporation, St. Paul, Minn. 217 hooks/square centimeter, 120 grams/square meter basis weight and 0% TiO2. A top view of the hook material web is shown as a photomicrograph in FIG. 6. The transparency gap in the x-direction was d4 and the hook spacing was $C_3$. The transparency gap in the y-direction was d5 and the hook spacing was $C_4$.

Hook Material 14

Figure 7:
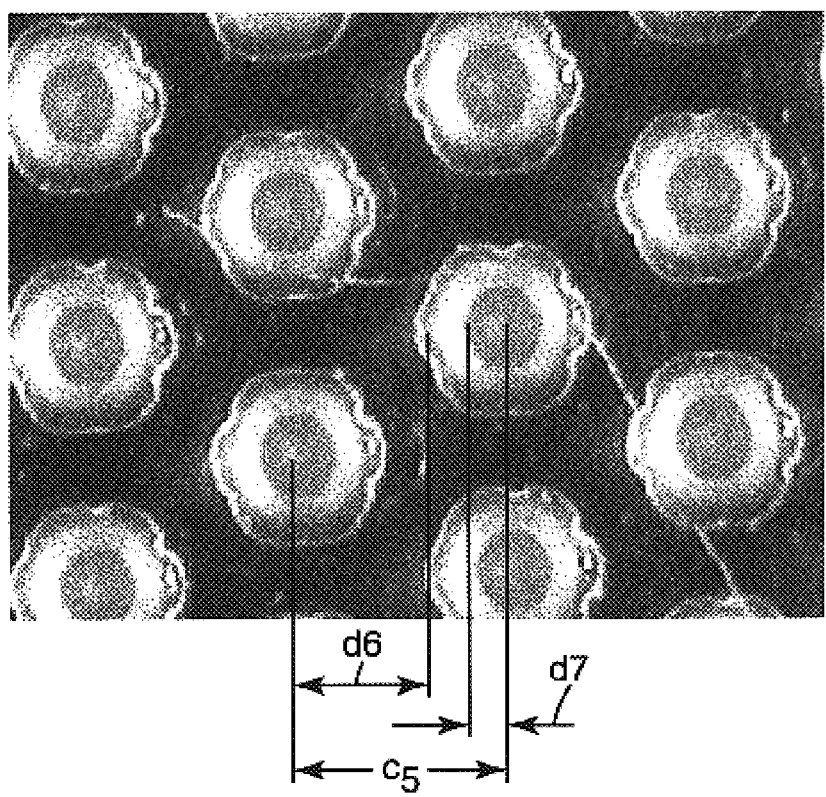
FIG. 7 is a top view of a hook strip useful in the present invention bundling strap.

This was a commercially available Microplast hook material from Gottlieb Binder GmbH, Holzgerlingen, Germany with 290 hooks/square centimeter and 0% TiO2. A top view of the hook material web is shown as a photomicrograph in FIG. 7. The transparency gap in the x-direction was d6 plus d7 and the hook spacing was $C_5$.

EXAMPLE 1

The smooth non-hook side of Hook Material 13 was printed with the UPC bar code symbol using a flexographic printing process and a Multibond ink (Sun Chemical Ink, Northlake, Ill.). The bar code was printed at 125% of nominal and truncated to 1.6 cm in bar height. The bar code was printed such that the lines of the bar code were in the cross direction of the hook material web. A moisture-curable solvent-based polyurethane adhesive was coated onto the printed side of the hook material web using a gravure roll and then laminated to a nylon knitted loop fabric (Boccolina 32 grams/square meter, Sitip SpA, Bergamo, Italy). The laminate was then slit to produce 1.27 cm wide rolls of bundling straps.

EXAMPLE 2

The smooth non-hook side of Hook Material 13 was printed with the UPC bar code symbol using a flexographic printing process and a Ultrabond ink (Sun Chemical Ink, Northlake, Ill.). The bar code was printed at 150% of nominal and truncated to 1.6 cm in bar height. The bar code was printed such that the lines of the bar code were in the cross direction of the hook material web. An adhesive coated knitted loop substrate (KN-2543 3M Corp. St. Paul, Minn.) was laminated onto the printed side of the hook material web. KN-2543 consists of the Boccolina fabric mentioned above, a 25 micron LDPE film on the backside of the fabric and a pressure-sensitive adhesive (50% Kraton 1107 block copolymer Kraton Polymers Inc., Houston, Tex., 50% Wingtack Plus tackifier, Goodyear Chemicals, Akron, Ohio, 27 grams/square meter coating weight) on the exposed side of the film. The laminate was then slit to produce 1.27 cm wide rolls of bundling straps.

Table 1 below shows the width of the cap portion of the hooks and the spacing of the hooks on the web. The dimensions were measured in the cross-direction (CD or X) of the web except for Hook Material 5 which was also measured in the machine-direction (MD or Y) to demonstrate the directionality sensitivity of the scannability test.

TABLE 1

| Hook Material | Cap Width (microns) | Hook Spacing (microns) |
|---|---|---|
| 1 (X) | 409 | 819 |
| 2 (X) | 406 | 833 |
| 3 (X) | 434 | 735 |
| 4 (X) | 424 | 839 |
| 5 (X) | 432 | 871 |
| 5 (Y) | 523 | 1342 |
| 6 (X) | 444 | 839 |
| 7 (X) | 472 | 814 |
| 8 (X) | 452 | 832 |
| 9 (X) | 523 | 847 |
| 10(X) | 411 | 792 |
| 11(X) | 437 | 828 |
| 12(X) | 411 | 822 |
| 13(X) | 381 | 761 |
| 13(Y) | 302 | 617 |
| 14(X) | 457 | 543 |

Table 2 below shows the Transparency Gap measurements in both absolute numbers and as a percent, for the hook materials along with the bar code scannability. In general, as the % Transparency Gap in between the hooks increases, the ability to successfully scan a bar code increases.

TABLE 2

| Hook Material | Transparency Gap (microns) | Transparency Gap (%) | Opacity (%) | Scannability (%) |
|---|---|---|---|---|
| 1 | 539(X) | 66 | 24.6 | 93(Y) |
| 2 | 495(X) | 59 | 22.9 | 80(Y) |
| 3 | 531(X) | 77 | 25.1 | 95(Y) |
| 4 | 474(X) | 57 | 32.1 | 79(Y) |
| 5 | 584(X) | 67 | 17.6 | 98(Y) |
| 5 | 233(Y) | 19 | 17.6 | 0(X) |
| 6 | 621(X) | 74 | 14.6 | 85(Y) |
| 7 | 494(X) | 61 | 31.9 | 72(Y) |
| 8 | 485(X) | 58 | 23.3 | 64(Y) |
| 9 | 496(X) | 59 | 27.3 | 70(Y) |
| 10 | 462(X) | 58 | 27.3 | 90(Y) |
| 11 | 484(X) | 58 | 25.7 | 83(Y) |
| 12 | 491(X) | 60 | 43.7 | 27(Y) |
| 13 | 552(X) | 73 | 19.8 | 90(Y) |
| 13 | 325(Y) | 53 | 19.8 | 100(X) |
| 14 | 463(X) | 85 | 15.7 | 88(Y) |
| 14 | 435(Y) | 70 | 15.7 | 72(X) |
| Example 1 | 384(X) | 50 | 19.8 | 77(Y) |
| Example 2 | 384(X) | 50 | 19.8 | 87(Y) |

We claim:

1. A mechanical fastener bundling strap comprising a bundling strap having a first face and a second face, with the first face formed by a thermoplastic hook strip material having a first face and a second face, the hook strip first face having an array of upstanding hook projections which form at least in part the first face of the bundling strap, the second face of the hook strip comprising a film which film is provided with a printed UPC code readable through the hook strip first face.

2. The mechanical fastener bundling strap of claim 1, wherein the bundling strap second face is provided at least in part with a mating mechanical fastener web engagable with the hook projections of the extruded hook strip.

3. The mechanical fastener bundling strap of claim 2 wherein the mating mechanical fastener is a loop fabric.

4. The mechanical fastener bundling strap of claim 2 wherein the mating mechanical fastener is a mating hook strip.

5. The mechanical fastener bundling strap of claim 3 wherein the loop fabric has a film backing.

6. The mechanical fastener bundling strap of claim 1 wherein the UPC code is printed onto the second face of the hook strip.

7. The mechanical fastener bundling strap of claim 1 wherein a UPC is printed onto a substrate laminated to the second face of the hook strip.

8. The mechanical fastener bundling strap of claim 7 wherein the UPC printed substrate is a film which is adhesively laminated to the hook strip second face.

9. The mechanical fastener bundling strap of claim 1 wherein the film between the hooks is substantially transparent continuously along at least a band of adjacent hooks at an angle to UPC code bars along at least the length of the UPC code bars.

10. The mechanical fastener bundling strap of claim 9 wherein the band provides a transparency gap of at least 250 $\mu$m.

11. The mechanical fastener bundling strap of claim 9 wherein the band provides a transparency gap of at least 300 $\mu$m.

12. The mechanical fastener bundling strap of claim 9 wherein the transparency gap percentage over at least a portion of the hook strip is at least 20 percent.

13. The mechanical fastener bundling strap of claim 9 wherein the transparency gap percentage over at least a portion of the hook strip is at least 30 percent.

14. The mechanical fastener bundling strap of claim 9 wherein the hook strip opacity is less than 50 percent.

15. The mechanical fastener bundling strap of claim 9 wherein the hook strip opacity is less than 30 percent.

16. The mechanical fastener bundling strap of claim 1 wherein the bar code scannability is greater than 10 percent.

17. The mechanical fastener bundling strap of claim 1 wherein the bundling strap has a Gurley stiffness of at least 10.

* * * * *

UNITED STATES PATENT AND TRADEMARK OFFICE
CERTIFICATE OF CORRECTION

PATENT NO.    : 6,684,464 B1
DATED         : February 3, 2004
INVENTOR(S)   : Mody, Kirit C.

It is certified that error appears in the above-identified patent and that said Letters Patent is hereby corrected as shown below:

Column 3,
Line 55, please delete "book " and insert -- hook --.

Signed and Sealed this

Twenty-ninth Day of June, 2004

JON W. DUDAS
*Acting Director of the United States Patent and Trademark Office*